United States Patent [19] [11] 4,357,608
Lewis [45] Nov. 2, 1982

[54] SCANNING RADAR SYSTEM

[75] Inventor: Bernard L. Lewis, Oxon Hill, Md.

[73] Assignee: The United States of America as represented by the Secretary of the Navy, Washington, D.C.

[21] Appl. No.: 183,697

[22] Filed: Sep. 3, 1980

[51] Int. Cl.³ .................. G01S 3/58; G01S 13/48; G01S 13/70; H01Q 3/04
[52] U.S. Cl. .................. 343/5 SW; 343/7.3; 343/11 R; 343/100 SA; 343/757; 343/766; 343/777; 343/876
[58] Field of Search ........... 343/5 SW, 777, 876, 343/7.3, 11, 100 SA, 757, 766, 777, 876, 11 R; 455/78

[56] References Cited

U.S. PATENT DOCUMENTS

| | | | |
|---|---|---|---|
| 2,644,940 | 7/1953 | DeFrance | 343/7.3 |
| 2,693,583 | 11/1954 | Rigrod | 343/876 X |
| 3,004,256 | 10/1961 | Parker | 343/757 X |
| 3,016,531 | 1/1962 | Tomiyasu et al. | 343/11 R X |
| 3,070,795 | 12/1962 | Chambers | 343/16 R |
| 3,274,590 | 9/1966 | Page | 343/11 R X |
| 3,806,932 | 4/1974 | Dietrich et al. | 343/100 SA |
| 3,845,481 | 10/1974 | Danzer | 343/7.3 |
| 3,945,009 | 3/1976 | Trigon | 343/777 X |
| 3,987,440 | 10/1976 | Danzer | 343/7.3 X |
| 4,216,473 | 8/1980 | Goldfischer et al. | 343/5 SW X |

Primary Examiner—Malcolm F. Hubler
Attorney, Agent, or Firm—Robert F. Beers; William T. Ellis; Alan P. Klein

[57] ABSTRACT

A scanning radar system having the capability of taking a number of successive looks at the same range and angle resolution cells with several millisecond time intervals between looks. The scanning radar system includes a pulsed transmitter, a receiver, and an array of energy beam radiators having individual beam paths with associated centerlines. A commutator switch and a duplexer sequentially connect a different one of the radiators to the pulsed transmitter at the beginning of each pulse repetition period and to the receiver during the subsequent interval between pulsed transmissions. A motor rotates the array of radiators as a unit to cause the beam path centerlines to rotate and scan the field of view. A plurality of delay units and a commutator switch are connected to the output of the receiver for processing the pulses returned to each of the radiators from resolution cells in the field of view during the intervals of time between pulsed transmissions to cause the pulses returned to different radiators from the same resolution cell to be in time coincidence.

10 Claims, 2 Drawing Figures

SCANNING RADAR SYSTEM

BACKGROUND OF THE INVENTION

The present invention relates generally to radar apparatus, and more particularly to radar apparatus with a look-back capability.

U.S. Pat. No. 3,971,997 issued to Bernard L. Lewis and Irwin D. Olin on July 27, 1976, discloses a method of suppressing radar echoes from a disturbed sea surface without suppressing echoes from rigid bodies on or near the surface. However, the use of this technique requires several (3 or more) successive looks at the same range and angle resolution cells with several millisecond time intervals between looks. Known radars capable of exploiting this technique employ mechanically stepped multi-beam antennas or phased arrays with a look-back capability.

SUMMARY OF THE INVENTION

Accordingly, it is an object of the present invention to provide a radar which can exploit the Lewis-Olin technique with a continuously scanning multi-beam antenna.

Briefly stated, this and other objects of the present invention are realized in a scanning radar system with look-back capability. The radar system includes a pulsed transmitter, a receiver, and an array of radiators. Each radiator has an individual beam path with an associated centerline. A different one of the radiators is sequentially connected to the pulsed transmitter at the beginning of each pulse repetition period and to the receiver during the subsequent interval of time between transmissions. Simultaneously therewith, the beam path centerlines of the radiators are rotated as a unit to scan a field of view. The pulses returned to each of the radiators from resolution cells in the field of view during the time between pulsed transmissions are processed to cause the pulses returned from the same resolution cell to different radiators to be in time coincidence. The multiple time samples of the same resolution cells can then be processed in accordance with the teachings of U.S. Pat. No. 3,971,997, referenced above.

One advantage of this invention is that an inexpensive antenna and antenna drive system can be used in a continuously scanning mode with look-back provided by offset radiators and delays. Another advantage is that high scan rates can be used without requiring a high-power mechanical stepper drive for a mechanically driven antenna.

Additional advantages and features will become apparent as the subject invention becomes better understood by reference to the following detailed description when considered in conjunction with the accompanying drawings therein:

DESCRIPTION OF THE PREFERRED EMBODIMENT

Figure 1:
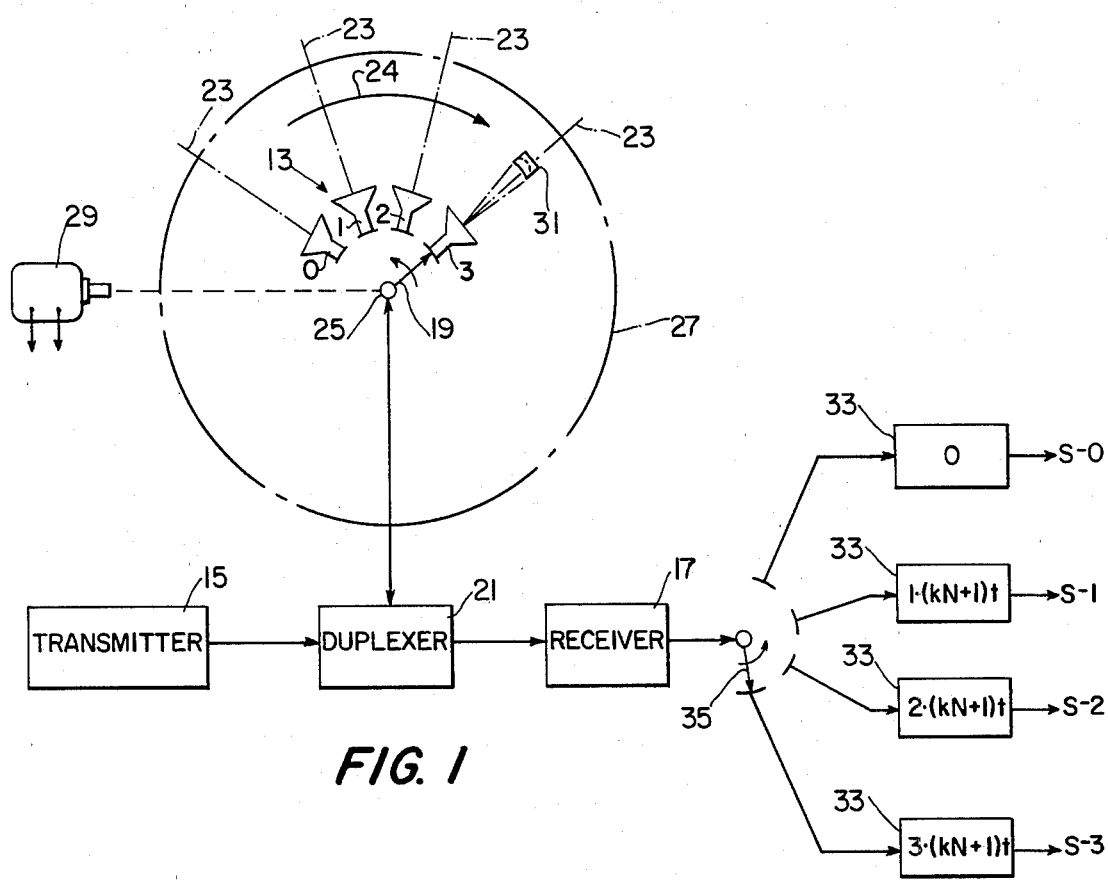
FIG. 1 is a block diagram of a scanning radar system in accordance with the subject invention.

Referring to FIG. 1, the scanning radar system includes connection means for sequentially connecting a different radiator of a linear array 13 of narrow beam (e.g. fan or pencil beam) radiators (labeled 0 through 3) to a pulsed radar transmitter 15 at the beginning of each pulse repetition period and to a receiver 17 during the subsequent interval of time between transmissions. While the connection means may take a variety of forms, conveniently it may take the form illustrated in FIG. 1 of a commutator switch 19 and a duplexer 21 which is connected to the commutator switch, to the output of the transmitter 15 and to the input of the receiver 17. The commutator switch 19 has a plurality of contacts, each connected to a respective radiator. To maintain the clarity of the drawing, only four radiator and four contacts are illustrated; it will be understood, however, that as many radiators and contacts may be employed as the number of desired output signals from the radar system. The commutator switch 19 is arranged to operate continuously at such a rate that a different one of the contacts is connected to the duplexer 21 at the beginning of each pulse repetition period.

The centerlines of the individual beam paths of the radiators of array 13 are indicated in FIG. 1 by chain lines 23. Also included in the scanning radar system is rotation means for rotating the beam path centerlines 23 as a unit about a vertical axis 25 to permit the radiators to scan the field of view 27 in a full 360° azimuthal pattern. While the rotation means may take a variety of forms, conveniently it may take the form illustrated in FIG. 1 of a motor 29 which rotates the array 13 of radiators as a unit in the direction indicated by arrow 24 about the vertical axis 25. The pulse repetition rate of the pulsed transmitter 15 is made high enough so that as the field of view 27 is scanned, the centerlines 23 are displaced by no more than 0.3 beam widths during a complete cycle of the commutator switch 19.

As any given resolution cell 31 (whose dimensions generally depend on the radiator beam width and the transmitted pulse width) is scanned by the array 13 of radiators, it will be crossed by the beam path centerline 23 of radiator 3, then 2, 1 and 0 in that order. The crossing of the resolution cell 31 by each centerline 23 is made coincident with the time of dwell of the commutator switch 19 on the respective radiator so that the resolution cell is intercepted by a beam of energy from the radiator. This is accomplished by choosing the rate of rotation and spacing of the beam path centerlines 23 such that adjacent beam path centerlines cross any given resolution cell 31 exactly (kN + 1) pulse repetition periods apart, where k is an integer and N is the number of radiators (N = 4 in the illustrated embodiment). The pulse of energy reflected from the resolution cell 31 by an individual radiated beam is returned to the corresponding radiator.

Processing means is connected to the output of the receiver 17 for processing the pulses returned to each of the radiators from resolution cells 31 in the field of view 27 during the intervals of time between transmissions to cause the pulses returned to different radiators from the same resolution cell to be in time coincidence. While the processing means may take a variety of forms, conveniently it may take the form illustrated in FIG. 1 of a plurality of delay units 33 and a commutator switch 35 which is connected to the output of the receiver 17. The commutator switch 35 has a plurality of contacts, each connected to a respective delay unit 33. The commutator switch 35 is arranged to operate continuously at such a rate that a different one of the contacts is connected to the receiver 17 at the beginning of each pulse repetition period. In this way, the output signal from each of the radiators is applied to a respective delay unit 33. In accordance with the invention, the output signal from each radiator is delayed as a function of the time between crossings of any given resolution cell 31 by the beam path centerlines 23. For example, the output signal S-0 from radiator 0 has no time delay applied thereto; signal S-1 is delayed for $1 \cdot (kN + 1)$ pulse repetition periods; signal S-2 is delayed $2 \cdot (kN + 1)$; signal S-3, $3 \cdot (kN + 1)$; and so forth.

Figure 2:
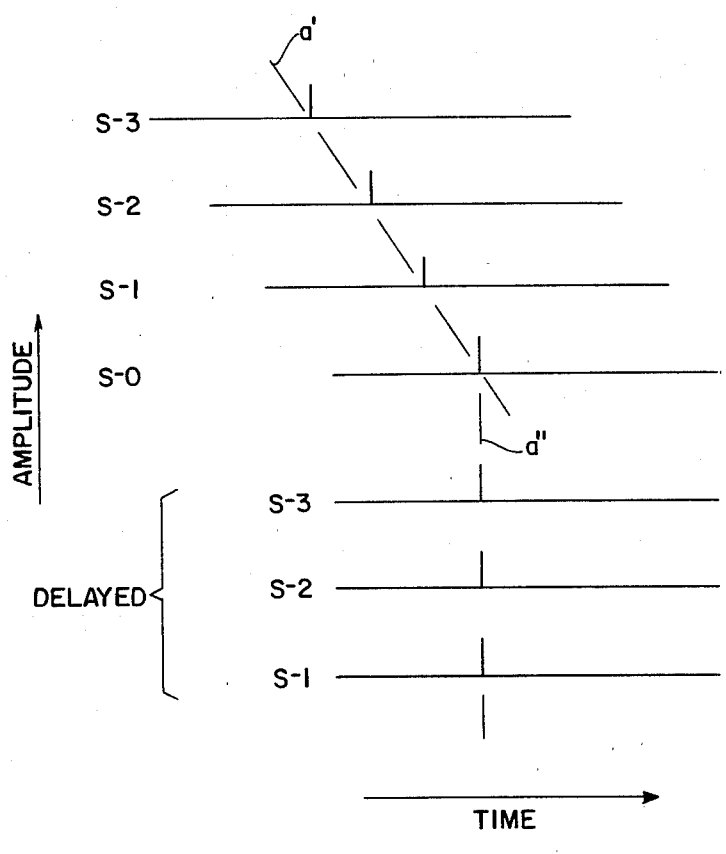
FIG. 2 is a timing diagram of the response of the system of FIG. 1 to the reflection of energy from a given resolution cell.

The segments of the output signals from each of the radiators corresponding to the return from any given resolution cell are shown in the first four rows of FIG. 2. As indicated by the diagonal line a' in FIG. 2, the segments are displaced in time from each other in a linear fashion. Rows 5 through 7 (counting down in sequence from the top row in FIG. 2) illustrate the delayed output signal segments with the four signal segments corresponding to the same resolution cell now being in time coincidence as indicated by vertical line a".

The delayed output signals can be fed to a suitable utilization device (not shown) for processing in the manner described in U.S. Pat. No. 3,971,997, herewith incorporated by reference.

While the array of radiators and the rotation means have respectively been illustrated by a plurality of horns and a motor for rotating the horns as a unit, it is to be understood that these elements may take a variety of other forms. For example, the horns may be replaced by feeds illuminating either one or more parabolic reflectors or a lens. In another example, the radiators may comprise a plurality of feeds illuminating a linearly-polarized parabolic reflector, and the rotation means may comprise a rotatable half-wave plate reflector whose axes are orthogonal to the axis of the parabolic reflector.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A scanning radar system comprising:
    a pulsed transmitter;
    a receiver;
    an array of energy beam radiators having individual beam paths with associated centerlines;
    connection means for sequentially connecting a different one of the radiators to the pulsed transmitter at the beginning of each pulse repetition period and to the receiver during the subsequent interval between pulsed transmissions;
    rotation means for rotating the beam path centerlines as a unit to scan a field of view; and
    processing means connected to the output of the receiver for processing the pulses returned to each of the radiators from resolution cells in the field of view during the intervals of time between pulsed transmissions to cause the pulses returned to different radiators from the same resolution cell to be in time coincidence.

2. The scanning radar system recited in claim 1 wherein the connection means includes:
    a commutator switch; and
    a duplexer connected to the commutator switch, to the output of the pulsed transmitter and to the input of the receiver,
    the commutator switch having a plurality of contacts, each contact connected to a respective energy beam radiator, the commutator switch arranged to operate continuously at such a rate that a different one of the contacts is connected to the duplexer at the beginning of each pulse repetition period.

3. The scanning radar system recited in claim 1 wherein the rotation means includes:
    a motor connected to the array of radiators for rotating the array as a unit.

4. The scanning radar system recited in claim 1 wherein the processing means includes:
    a plurality of delay units for delaying the output signals of the radiators as a function of the time between crossings of any given resolution cell of the field of view by the beam path centerlines; and
    a commutator switch connected to the receiver and having a plurality of contacts, each contact connected to a respective delay unit, the commutator switch arranged to operate continuously at such a rate that a different one of the contacts is connected to the receiver at the beginning of each pulse repetition period.

5. The scanning radar system recited in claim 1 wherein:
    the connection means functions to sequentially and cyclically connect a different one of the radiators to the pulsed transmitter at the beginning of each pulse repetition period and to the receiver during the subsequent interval between pulse transmissions; and
    the pulse repetition rate of the pulsed transmitter is high enough so that the individual beam path centerlines are displaced by no more than 0.3 beam widths between cycles of the connection means.

6. The scanning radar system recited in claim 1 wherein:
    the rotation means functions to rotate the beam path centerlines as a unit to scan the field of view such that adjacent beam path centerlines cross any given resolution cell in the field of view exactly $(kN + 1)$ pulse repetition periods apart, where k is an integer and N is the number of radiators.

7. A radar scanning method comprising the steps of:
    sequentially connecting a different one of an array of energy beam radiators having individual beam paths with associated centerlines to a pulsed transmitter at the beginning of each pulse repetition period and to a receiver during the subsequent interval of time between pulsed transmissions;
    rotating the beam path centerlines as a unit about a rotation axis to scan a field of view; and
    processing the pulses returned to each of the radiators from resolution cells in the field of view during the intervals of time between transmissions to cause the pulses returned to different radiators from the same resolution cell to be in time coincidence.

8. The radar scanning method recited in claim 7 wherein the processing step includes:
    delaying the output signals of the radiators as a function of the time between crossings of any given resolution cell of the field of view by the beam path centerlines.

9. The radar scanning method recited in claim 7 wherein the rotating step includes:

adjusting the rate of rotation and the spacing of the beam path centerlines such that adjacent beam path centerlines cross any given resolution cell of the field of view exactly (kN+1) pulse repetition periods apart, where k is an integer and N is the number of radiators.

10. The radar scanning method recited in claim 7 including the steps of:
repeating the sequential connecting step; and
making the pulse repetition rate high enough so that the individual beam path centerlines are displaced by no more than 0.3 beam widths between repetitions of the sequential connecting step.

* * * * *